United States Patent

Hapeman et al.

[11] 3,897,843
[45] Aug. 5, 1975

[54] ELECTRIC MOTORIZED WHEEL

[75] Inventors: Martin J. Hapeman, Edinboro; Hjalmar A. Olson, North East, both of Pa.

[73] Assignee: General Electric Company, Erie, Pa.

[22] Filed: Nov. 29, 1973

[21] Appl. No.: 420,139

[52] U.S. Cl. ............... 180/65 F; 105/53; 308/16; 310/67 R; 310/83
[51] Int. Cl. .............................................. B60l 7/00
[58] Field of Search ........ 180/65 F, 65 R, 65 A, 60, 180/55, 10, 44 E, 44 F, 44 M, 43 B, 66 F; 310/67 R, 83; 301/6 D; 308/16, 174; 105/53

[56] References Cited
UNITED STATES PATENTS

| | | | |
|---|---|---|---|
| 680,804 | 8/1901 | Newman et al. | 310/67 R |
| 834,879 | 11/1906 | Annable | 310/67 R |
| 1,577,304 | 3/1926 | Schurch | 310/67 R |
| 2,506,146 | 5/1950 | Gladisch | 310/67 R |
| 2,708,767 | 5/1955 | Dean | 308/174 X |
| 2,899,005 | 8/1959 | Speicher | 180/10 |
| 3,035,652 | 5/1962 | McLean | 180/60 X |
| 3,275,391 | 9/1966 | Blais | 308/174 |

Primary Examiner—David Schonberg
Assistant Examiner—Milton L. Smith
Attorney, Agent, or Firm—Dana F. Bigelow

[57] ABSTRACT

A tire mounted wheel hub forms an integral part of a motor frame which is rotatably supported at its one end by a vehicle frame mounted arcuate flange and an included multi-direction bearing. The motor armature is bearing mounted in the motor frame and drives a planetgear assembly to transmit torque to the motor frame and cause it to rotate in counterrotational relationship with said armature and thereby propel a vehicle. The frame serves a tri-purpose function as a motor frame, a wheel, and a support for the armature, while deriving its sole support from a single multi-directional bearing.

15 Claims, 12 Drawing Figures

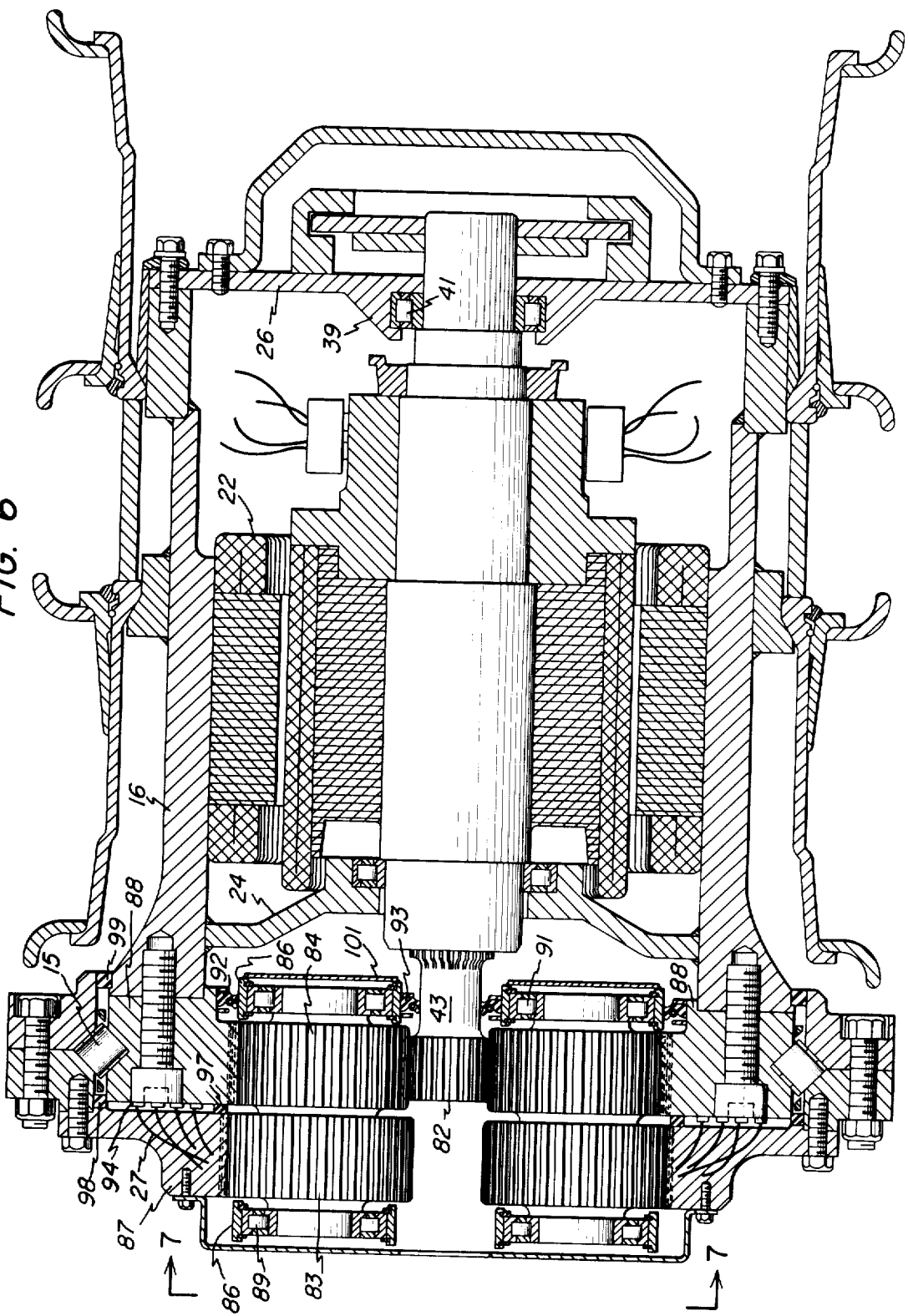

ELECTRIC MOTORIZED WHEEL

BACKGROUND OF THE INVENTION

This invention relates generally to motor vehicles and more particularly to vehicles driven by individually powered electric motorized wheels.

Off-highway vehicles of the type used for haulage, such as scrapers, loaders and trucks, have great demands placed on them to economically haul large payloads over rough and varied terrain. To meet these demands of high haulage capacity and low operating costs it has been found that an electric drive system is desirable. A typical electric drive system for an off highway vehicle comprises a prime mover, a generator, and a pair of motorized wheels. The prime mover and generator are mounted on the vehicle and supply electrical power to the motorized wheels which are mounted on individual axes on opposite sides of the vehicle longitudinal axis.

One such system is shown and described in U.S Pat. No. 2,899,005, issued to William Speicher on Aug. 11, 1959 and assigned to the assignee of the present invention. A feature of its design is the utilization of a d-c traction motor magnet frame as the wheel axle on which a tire mounted hub is rotatably disposed. The need for a separate axle is thus eliminated to reduce undesirable weight. However, the combined weight of the stationary motor frame and the rotatable wheel hub assembly contribute significantly to the non-payload weight of the vehicle.

The motorized wheel design of the aforementioned patent is best suited for use with vehicles of the large class, as for example, trucks capable of hauling loads in excess of 100 tons. The high capacity and high power capabilities which it offers, warrants the cost of the specialized manufacturing and assembly requirements of the design. But where the same motor design is used in smaller vehicles, the reduction in cost is disproportionate to the reduction in size, since the same manufacturing and assembly requirements exist. A mere reduction in material costs does not economically justify the reduction in load carrying capability, and the design is not competitive with hydraulic or mechanical drive systems of equivalent size.

It is therefore an object of this invention to provide an electrical motorized wheel system for use with smaller haulage vehicles.

Another object of this invention is the provision for an electric motorized wheel of lower weight and cost of manufacture.

Yet another object of this invention is the provision for a motorized wheel which is simple to manufacture and assemble.

Still another object of this invention is the provision for a motorized wheel which has fewer component parts.

A further object of this invention is the provision for a motorized wheel which is functional and economical in use.

These objects and other features and advantages become more readily apparent upon reference to the following description when taken in conjunction with the appended drawings.

SUMMARY OF THE INVENTION

In accordance with one aspect of the invention the motorized wheel is simplified in eliminating the intermediate stationary housing by combining the rim and motor frame as a single unit which rotates in counter-rotational relationship to an armature mounted therein. The entire combination is overhung from the vehicle frame and supported by a single large diameter pentaload bearing in which one end of the motor frame is rotably disposed. A planetary gear train located within the bearing transmits torque from the armature to a ring gear on the inner periphery of the motor frame to propel the vehicle.

The pentaload bearing is capable of carrying a load in three directions - radial load and thrust load in either direction - thereby providing an overturning load capability which allows the feature of the overhung assembly. The outer bearing race comprises a flange secured to the vehicle frame and is preferably of the split type to facilitate the assembly process and the maintenance of precision tolerances.

In the drawings as hereinafter described a preferred embodiment is depicted; however, various other modifications and alternate constructions can be made thereto without departing from the true spirit and scope of the invention.

BRIEF DESCRIPTION OF THE DRAWINGS

FIG. 6 is a sectional view of a modified embodiment of the invention.

DESCRIPTION OF THE PREFERRED EMBODIMENT

Figure 1:
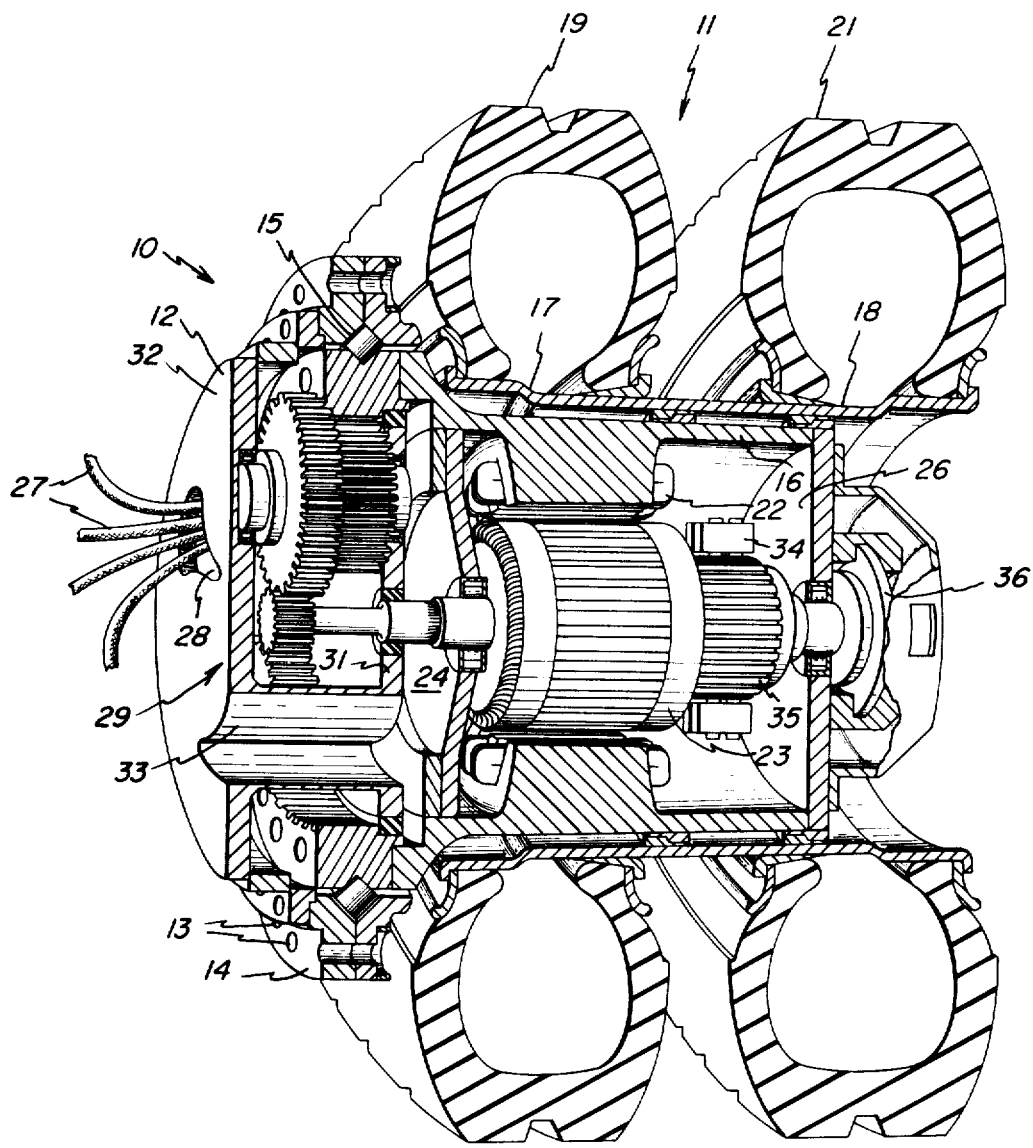
FIG. 1 is a perspective representation of the invention showing a longitudinal section of the preferred embodiment.

Referring now to FIG. 1 the invention is indicated generally at 10 as applied to a motorized wheel 11 used for propulsion of an off-highway vehicle (not shown), as for example, a haulage truck. The motorized wheel assemblies are usually installed in pairs, on opposite sides of the vehicle longitudinal axis, with each assembly being mounted to the vehicle frame by a base frame 12 having holes 13 formed therein to receive mounting bolts. An annular flange 14 is formed as part of the base frame 12 to provide support for a cylindrical motor frame 16 overhung therefrom. A large diameter bearing 15 is disposed between the flange 14 and the outer surface of the motor frame 16 to allow for relative rotational movement. Extending outwardly in a cantilever fashion the motor frame 16 has rigidly attached thereto, in an outer concentric relationship, a pair of axially spaced wheel hubs 17 and 18 having ground engaging pneumatic tires 19 and 21 mounted thereon.

Mounted concentrically on the inner side of the motor frame 16 are a plurality of field coils 22 and a motor rotor or armature 23, rotatably supported from the motor frame 16 by oppositely disposed bearing support members 24 and 26. Delivery of electrical power to the motor is facilitated by power cables 27 passing through an aperture 28, the method being more fully described hereinafter.

Torque from the motor rotor 23 is transmitted through a planetary gear train 29 to the motor frame, so as to cause rotation with respect to the flange 14 and thereby propel the vehicle. Bearing support for the gear train 29 is provided by the base frame inner and outer walls 31 and 32, respectively, which are interconnected by the thru-tubes 33 as will be more clearly seen upon reference to FIG. 3. These thru-tubes provide a means for passing the power cables through the base frame 12 and also as conduits for forced ventilation.

As shown in FIG. 1 the type of motor used may be of the d-c type and therefore include a commutator 35 and associated brushes 34 located at one end thereof. However, it should be understood that an a-c motor may alternatively be used and may even be preferable provided a suitable control system is available. In either case, a disc brake 36 of the conventional type may be mounted on the outer end of the rotor shaft for the purpose of applying braking torque to the system Referring now to FIGS. 2 and 3 the rotatable motor frame 16 can be seen with its field coils 22 securely attached thereto. Attached to the ends thereof, by welds 37 or the like, are the bearing support members 24 and 26 which extend radially inwardly to bearing housings 38 and 39. A pair of suitable anti-friction bearings, as for example, roller bearings 40 and 41, are disposed therein to support the shaft 42 of the rotor 23. Motor action of the rotor 23 and shaft 42 are transmitted to the planetary gear train through a sun pinion 43 having a suitable connection means such as a spline 44 on one end and having a sun gear 46 on the opposite end thereof. The spline 44 is preferably crowned to allow slight radial movements of the sun gear 46 about its axis. Arcuately spaced around the sun gear 46 are three planetary gears 47 which engage the sun gear and which are driven thereby. It is not a true planetary gear system since the planetary gears 47 do not revolve around the sun pinion. Rather, they are rotated on their axes which are located at fixed points 48 on the vertices of an equalateral triangle, (FIG. 3). Disposed between the planet gears 47 and the flange portion 14 of the base frame 12 are three circumferentially spaced thru-tubes 33, triangular in cross section and extending axially from the base frame inner wall 31 to its outer wall 32. Through the aperture 28 of one of the thru-tubes 33 pass the power cables 27 for supplying power to the motor from a generator aboard the vehicle (not shown).

The planetary gears 47 have integrally associated planet pinions 49 extending outwardly to engage and drive a large diameter ring gear 51 which is mounted to the inner end of the motor frame 16 by a plurality of bolts 52. In operation the sun pinion 43 is rotated in one direction (e.g. in the clockwise direction) and the planet gears 47 and pinions 49 are caused to rotate in the opposite direction, thereby turning the ring gear motor housing and wheel hubs in that direction (counterclockwise) to propel the vehicle. Support for the ring gear and motor housing assembly is provided by the large diameter bearing 15 as will be more fully described hereinafter.

Referring again to the planet gears 47 and pinions 49, support is provided therefor by the inner 31 and outer 32 walls of the base frame between which they are mounted. Inner and outer bearings 53 and 54, preferably of the roller type, support the respective ends of the planet gear/pinion and allow them to rotate therein. Since the base frame 12 with its inner and outer walls 31 and 32 acts as a gear housing and lubrication sump, entry into the outer wall 32 by the sun pinion 43 and ring gear 51 necessitates the use of seals to adequately protect against leakage. Accordingly, an annular seal 56 is provided between the sun pinion 43 and outer wall 32, another 57 is provided at the interface of the outer wall 32 and the ring gear 51. and still another 55 is provided between the flange 14 and the motor frame 16. These seals are preferably of the rotating type.

As mentioned hereinbefore, the motor frame 16 and ring gear 51 are supported by the large diameter bearing 15 mounted within the flange 14. The flange 14 comprises inner and outer sides, 58 and 59, to form a split outer race for the bearing 15. The inner side 58 is mounted to the base frame 12 by a plurality of bolts 61 and the outer side 59 is placed contiguous therewith and held in place by a plurality of bolts 62, which extend through holes 13 to connect the entire assembly to the vehicle frame. By use of such a split outer race arrangement, assembly of the bearing 15 and its associated bearing cage 63 in interposition between the flange (outer race) and ring gear (inner race) is facilitated.

Figure 2:
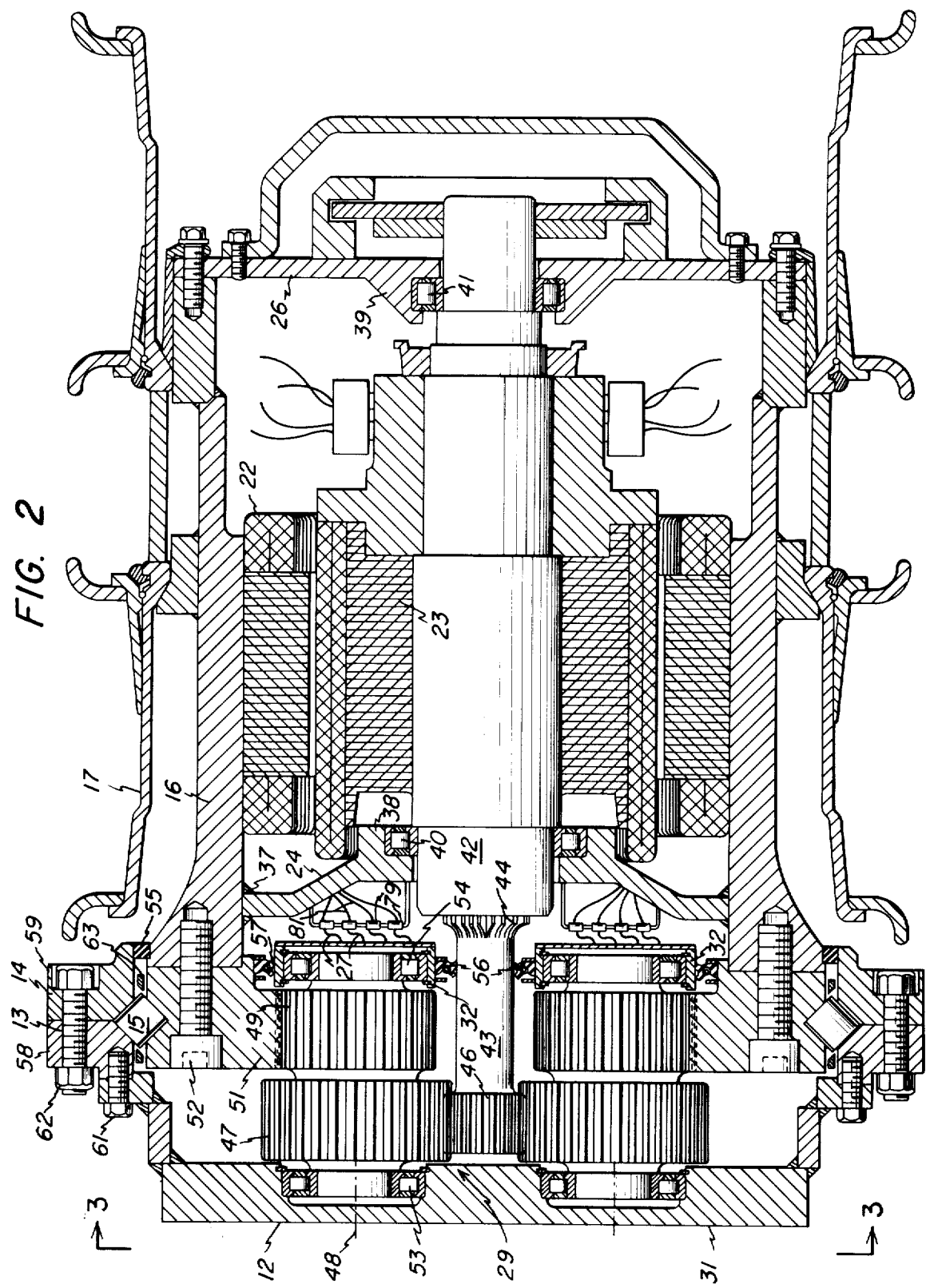
FIG. 2 is an enlarged sectional view of the invention in accordance with the preferred embodiment.
Figure 3:
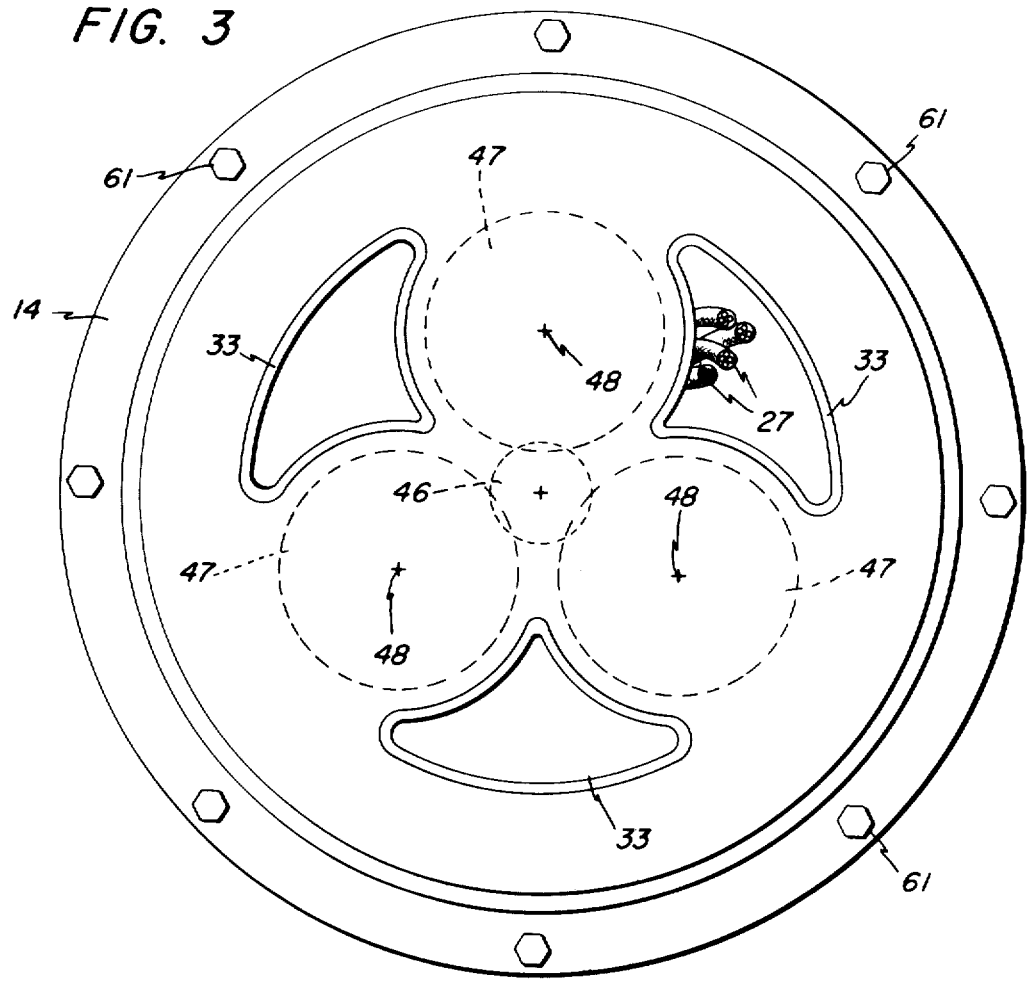
FIG. 3 is an end view thereof as seen along lines 3—3 of FIG. 2
Figure 4A:
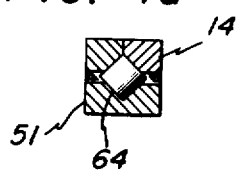
FIGS. 4a and 4b are illustrative views of the bearing portion of the preferred embodiment of the invention.
Figure 4B:
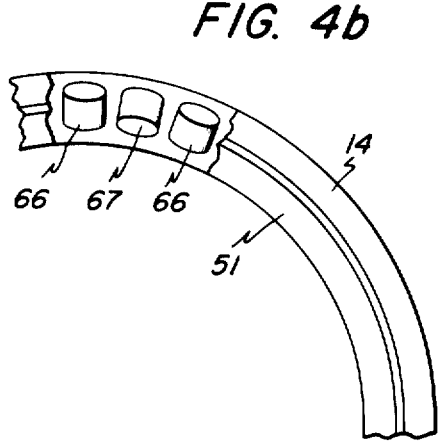

As can be seen from FIG. 2, in the overhung arrangement, wherein the bearing 15 supports the entire weight of the motor frame 16, the loading forces placed on the bearing are very great. In addition to the radial forces exerted thereon, an overturning moment causes great thrust forces to be applied. Support against these forces are provided by the multi-direction bearing 15 which can sustain loads in five different directions. A preferred type of pentaload bearing shown in FIGS. 4a and 4b is a Messenger "X" roller bearing manufactured by Messenger Bearing Inc. The outer and inner races 14 and 51, respectively, form a diamond shaped race 64 into which are placed the individual rollers 66 and 67 in alternate relationship, such that the axes of the rollers 66 are normal to the axes of the rollers 67, thus the designation X-type bearings. This arrangement allows a single bearing mount to carry the load where thrust, radial, and overturning moment loads are simultaneously present.

Figure 5A:
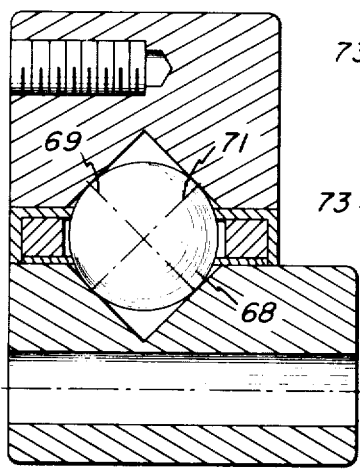
FIGS. 5a to 5e show alternative embodiments of the bearing portion of the invention.
Figure 5B:
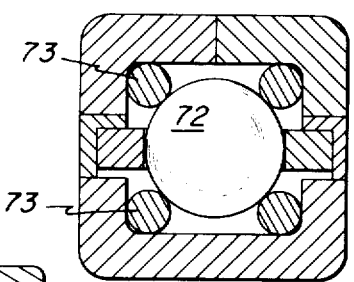
Figure 5C:
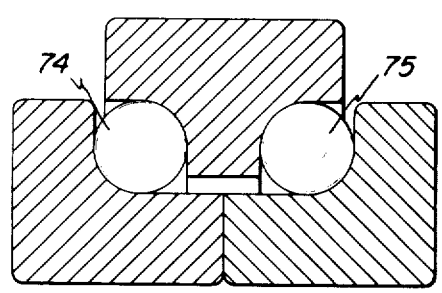
Figure 5E:
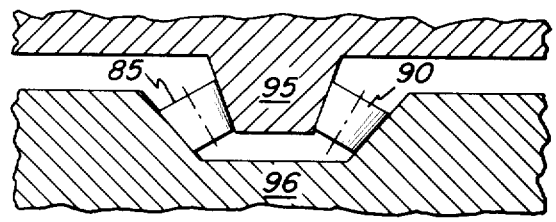
Figure 5D:
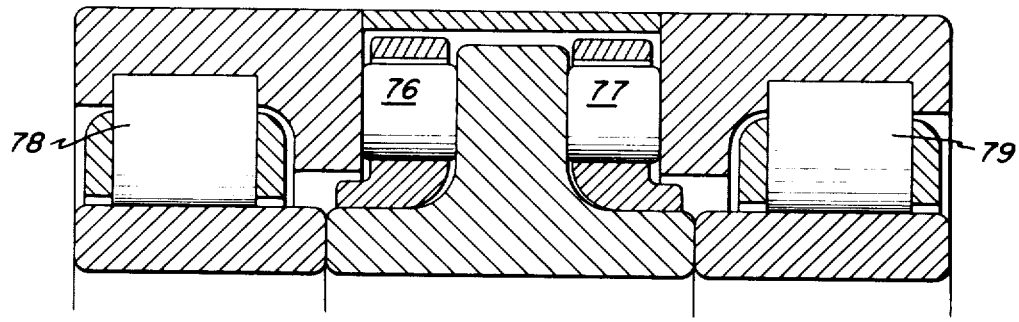

A number of alternative bearing arrangements which will accommodate the overhanging feature are illustrated in FIGS. 5a to 5e FIG. 5a shows a ball bearing of the X-type, wherein each ball is capable of carrying the force along either of a pair of normally disposed axes 69 and 71 (angular contact). FIG. 5b illustrates a pentaload bearing of the wire race type where the forces are transmitted to the ball 72 by four wire race elements 73 disposed around the ball and located on normal axes. FIG. 5c shows a pentaload bearing of the double row ball type wherein a pair of axially spaced ball bearings 74 and 75 share the loads. FIGS. 5d and 5e show pentaload bearings of the roller type. The bearing arrangement of FIG. 5(d) comprises an inner pair of rollers 76 and 77 which have their axes perpendicular to the major axis and carry the thrust load and an outer pair 78 and 79 which have their axes parallel to the major axis and carry the radial load. The arrangement of FIG. 5e shows a pair of axially spaced, steep angled tapered roller bearings 85 and 90. The inner and outer races 95 and 96 are double sided with the inner race 96 being split to accommodate assembly.

As mentioned hereinbefore power is provided to the motor by a plurality of cables 27 which pass through the aperture 28. Since both the rotor 23 and motor frame 16 are rotatable, it is necessary to provide a means for delivery of the power thereto. One suitable method for this purpose is the use of slip rings 80 as shown in FIG. 2. The power cables 27 which pass through one of the thru-tubes 33 are electrically connected to the slip rings 80 which are in turn electrically connected to leads 81 on the bearing support 24. This may be accomplished either by having stationary brushes contact rotating slip rings or by having rotating brushes contact stationary slip ring, the former arrangement being preferable. Leads 81 from the slip rings are connected two to the field coil 22 and two to the brushes 34 for delivery of current to the armature 23 through the commutator 35. In the event an a-c motor is used, only three slip rings will be required to bring the three phases to the field coils, there being no need for delivery of current to the rotor.

Figure 7:
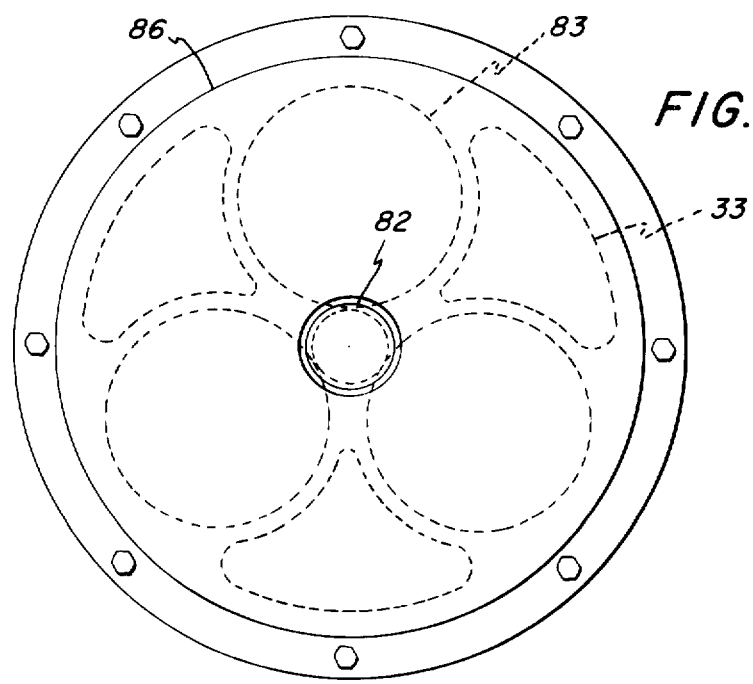
FIG. 7 is an end view thereof as seen along lines 7—7 of FIG. 6.

FIGS. 6 and 7 illustrate a modified embodiment of the gear drive system for use in vehicles wherein greater gear ratios are desirable. The planetary gear train 29 of FIGS. 2 and 3 is replaced by a compound differential planetary gear train comprising a sun gear 82 three planetary gears 83, having planet pinions 84 integrally attached thereto with the combination being rotatably mounted in a rotable planet cage 86, a stationary internal ring gear 87 with which the planet gears 83 are engaged, and a rotating internal ring gear 88, which is engaged and driven by the planet pinion 84. As can be seen from FIG. 6, the diameter of the planet pinion 84 is smaller from that of the planet gear 83, and the diameter of the rotating ring gear 88 is accordingly smaller than that of the stationary ring gear 87. The nature of the compound differential gear system is such that these diameter differences must exist to obtain rotational movement of the rotating ring gear in response to a rotation of the sun pinions.

In operation, when the sun pinion is rotated in one direction, as for example in the clockwise direction, the planet gears and pinions are rotated in the opposite (counter-clockwise) direction; while at the same time the planet cage is rotated, and the planet gears and pinions are accordingly caused to revolve in the clockwise direction. The rotatable ring gear 88 will thus be rotated in the clockwise direction at a speed determined by the diameter difference discussed hereinabove.

It should be noted that the diameter difference may just as well be in the opposite direction, the result being that the rotatable ring gear 88 will be rotated in the opposite direction. For example, if the diameter of the rotatable ring gear 88 is larger than that of the stationary ring gear 87, rotation of the sun pinion in the clockwise direction will result in a counterclockwise rotation of the ring gear 88.

As seen in FIG. 7 the thru-tubes 33 are present much like in the preferred embodiment. However, they do not act as conduits for ventilation, and do not carry the power cables since they are part of the planet cage 86 which rotates. The planet cage 86 contains axially spaced bearings 89 and 91 which straddle the planet gear/pinion in much the same manner as the preferred embodiment. Seals 92 and 93 are provided between the cage 86 and the ring gear 88 and the cage and the sun pinion 43, respectively, in a manner similar to that of the preferred embodiment. In addition, another seal 97 is placed on the internal side of the slip rings 94 to isolate them from the liquid lubricant. The bearing 15 is then lubricated by its own lubricant (preferably solid) and has the axially spaced seals 98 and 99 to retain the lubricant in its vicinity. Cover plates 101 are placed at the outer ends of each of the planet pinions 84 to prevent the loss of lubricant in a manner similar to that of the preferred embodiment.

Since the thru tubes 33 are rotatable in the design of FIGS. 6 and 7, the power cables 27 are brought in through the stationary ring gear 87 to slip rings 94. The leads are then routed in a manner similar to that described for the preferred embodiment hereinbefore.

What I claim as new and desire to secure by Letters Patent of the United States is:

1. An improved electric drive motor assembly for traction vehicles of the type wherein a motor armature assembly is connected by gearing means to cause rotation of wheel means mounted concentrically on the periphery of a motor frame comprising:
   a. said motor frame concentrically surrounding said motor armature and comprising radially inwardly extending bearing support members displaced along the longitudinal axis of said motor armature;
   b. said motor armature being rotatably secured by said bearing support members;
   c. wheel hub means rigidly secured to the outer periphery of said motor frame;
   d. gear drive means connected intermediate said armature and said motor frame to impart propulsion torque to said wheel hub means;
   e. base frame means adapted to secure said drive motor assembly on its inboard side to the frame of a vehicle, said base frame means comprising flange means;
   f. said motor frame comprising a portion located solely on the inboard side of said motor armature and concentrically arranged with said flange means;
   g. multidirectional bearing means disposed intermediate said flange means and said portion of the motor frame and adapted to transmit the load between said base frame means and said motor frame, said bearing means being constructed to accommodate thrust, radial and overturning loads, whereby said electric drive motor assembly is adapted to be overhung from said vehicle frame and supported solely by said multidirectional bearing means.

2. The arrangement of claim 1 wherein said bearing means comprises first and second raceways formed on adjacent peripheral surfaces of, respectively, said annular flange means and said portion of the motor frame, annular bearing cage means, and rolling members interposed therebetween.

3. The arrangement of claim 2 wherein said annular flange means extends coaxially about said portion of the motor frame, said bearing means comprising an outer raceway formed on the internal periphery of said annular flange means and an inner raceway formed on the outer periphery of said portion of the motor frame, annular bearing cage means interposed between said inner and outer raceway and said rolling members being interposed therein.

4. The arrangement of claim 3 wherein said annular flange portion comprises first and second members detachably secured to one another to form a split outer race.

5. An improved vehicle drive motor as set forth in claim 1 wherein said bearing comprises a pentaload bearing set which provides simultaneous support in five directions for radial, thrust and overturning moment loads.

6. An improved vehicle drive motor as set forth in claim 5 wherein said pentaload bearing comprises an X-type roller bearing.

7. An improved vehicle drive motor as set forth in claim 1 wherein said gear means includes an internal ring gear which forms an integral part of said portion of the motor frame.

8. An improved vehicle drive motor as set forth in claim 7 wherein said gear means comprises a compound differential planetary gear train and said base frame means incorporates a stationary internal ring gear, comprising:
   a. a sun pinion driven by said armature;
   b. a plurality of planet gears engaged therewith and rotationally and revolvably located in said stationary internal ring gear, said ring gear having a first internal diameter;
   c. a planet pinion integrally attached to each of said planet gears and having a diameter different therefrom;
   d. said internal ring gear forming an integral part of said portion of the motor frame constituting a rotational ring gear engaged with said planet pinions, said rotational ring gear having an internal diameter different from said stationary ring gear; whereby rotation of said sun pinion at one speed causes rotation of said rotational ring gear at another speed.

9. An improved vehicle drive motor as set forth in claim 8 and including power delivery means comprising a plurality of power cables electrically connected to a plurality of slip rings located between said stationary ring gear and said rotational ring gear, said slip rings being in turn electrically connected to said motor frame.

10. An improved vehicle drive motor as set forth in claim 8 wherein said planet pinions are supported at opposite ends by a rotating planet cage.

11. An improved vehicle drive motor as set forth in claim 1 wherein said gear means comprises:
   a. a sun pinion driven by said motor armature in one rotational direction;
   b. a plurality of planet gears engaged therewith and rotatable thereby, in the same rotationable direction, said planet gears having fixed axes and having planet pinions extending therefrom; and
   c. an internal ring gear attached to said motor frame and engaged with said planet pinions so as to be rotated thereby in an opposite rotational direction from said sun pinion.

12. An improved vehicle drive motor as set forth in claim 11 wherein said planet pinions are supported at their opposite ends by the vehicle frame.

13. An improved vehicle drive motor as set forth in claim 1 and including power delivery means comprising a plurality of power cables electrically connected to a plurality of slip rings located adjacent said motor frame, said slip rings being in turn electrically connected to said motor frame.

14. An improved vehicle drive motor as set forth in claim 1 wherein said motor frame comprises a stator, and said motor is of the a-c type.

15. A motorized wheel assembly for propelling a vehicle comprising:
   a. a base frame adapted to be attached to the vehicle and having a flange projecting outwardly therefrom;
   b. a motor frame having motor field coils therein and having its one axial end rotationally mounted to said flange and having its other end projecting outwardly and deriving its sole support from said flange;
   c. means for rigidly mounting at least one tire rim to the outer side of said motor frame;
   d. a motor armature rotatably mounted in and supported by said motor frame such that it is outwardly displaced from said base frame and said flange;
   e. power delivery means for providing electrical power to said field coils;
   f. gear means for transmitting the rotational motion of said armature to rotational motion of said motor frame to propel the vehicle; and
   g. multidirectional bearing means disposed intermediate said flange means and said one axial end of the motor frame to provide for rotational mounting of said motor frame to said flange, said bearing means being constructed to accommodate thrust, radial and overturning loads.

* * * * *